United States Patent
Terasaki et al.

(10) Patent No.: US 12,413,312 B2
(45) Date of Patent: Sep. 9, 2025

(54) COMMUNICATION APPARATUS, COMMUNICATION SYSTEM, STORAGE MEDIUM, AND COMMUNICATION METHOD

(71) Applicant: FURUKAWA ELECTRIC CO., LTD., Tokyo (JP)

(72) Inventors: Tomoaki Terasaki, Tokyo (JP); Kenichi Goto, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 59 days.

(21) Appl. No.: 18/193,786

(22) Filed: Mar. 31, 2023

(65) Prior Publication Data
US 2024/0097790 A1   Mar. 21, 2024

(30) Foreign Application Priority Data
Sep. 16, 2022   (JP) ................................. 2022-147551

(51) Int. Cl.
| | |
|---|---|
| *H04B 10/27* | (2013.01) |
| *H04B 10/112* | (2013.01) |
| *H04B 10/2575* | (2013.01) |
| *H04B 10/61* | (2013.01) |

(52) U.S. Cl.
CPC ... *H04B 10/25759* (2013.01); *H04B 10/1127* (2013.01); *H04B 10/27* (2013.01); *H04B 10/614* (2013.01)

(58) Field of Classification Search
CPC .............................. H04B 10/27; H04B 10/271
See application file for complete search history.

(56) References Cited

U.S. PATENT DOCUMENTS

| | | | | |
|---|---|---|---|---|
| 2004/0161235 A1* | 8/2004 | Halgren | .............. | H04J 14/0228 398/45 |
| 2007/0217788 A1* | 9/2007 | Gao | .................. | H04Q 11/0067 398/5 |
| 2014/0133853 A1* | 5/2014 | Ben-Shahar | ....... | H04Q 11/0005 398/45 |
| 2017/0306754 A1* | 10/2017 | Golparian | ............. | E21B 47/135 |

FOREIGN PATENT DOCUMENTS

| | | |
|---|---|---|
| JP | 2012-134641 A | 7/2012 |
| JP | 6533449 B2 | 6/2019 |
| WO | WO 2011/145218 A1 | 11/2011 |

OTHER PUBLICATIONS

Notification of Reasons for Refusal issued Jul. 15, 2025 in Japanese Patent Application No. 2022-147551, with machine translation, citing Doc. No. 15, 6 pages.

* cited by examiner

*Primary Examiner* — Nathan M Cors
(74) *Attorney, Agent, or Firm* — Oblon, McClelland, Maier &Neustadt, L.L.P.

(57) ABSTRACT

An access optical node includes an optical signal processing unit that transmits a received optical signal to a destination node. The optical signal processing unit includes a path switching unit that switches between a first path for transmitting the received optical signal to the destination node as it is as an optical signal, and a second path for transmitting the received optical signal to an electric signal processing unit and transmitting the optical signal processed by the electric signal processing unit to the destination node.

7 Claims, 10 Drawing Sheets

|  | End to End | 10G-EPON | XGS-PON |
|---|---|---|---|
| METRO OPTICAL NODE 2 | $\lambda 0$ | — | — |
| FIRST ACCESS OPTICAL NODE 1a | $\lambda 1$ | $\lambda a$ | — |
| SECOND ACCESS OPTICAL NODE 1b | $\lambda 2$ | $\lambda b$ | $\lambda d$ |
| THIRD ACCESS OPTICAL NODE 1c | $\lambda 3$ | $\lambda c$  $\lambda e$ | — |

COMMUNICATION APPARATUS, COMMUNICATION SYSTEM, STORAGE MEDIUM, AND COMMUNICATION METHOD

This application is based on and claims the benefit of priority from Japanese Patent Application No. 2022-147551, filed on 16 Sep. 2022, the content of which is incorporated herein by reference.

BACKGROUND OF THE INVENTION

Field of the Invention

The present invention relates to a communication apparatus, a communication system, a storage medium, and a communication method.

Related Art

Conventionally, an optical communication system has been known in which a plurality of communication apparatuses perform communication by transmitting and receiving optical signals. For example, a PON (Passive Optical Network) access system in which a plurality of ONUs (Optical Network Unit: Subscriber-side Optical Line Terminal Apparatus) are connected to one OLT (Optical Line Terminal: Station-side Optical Line Terminal Apparatus) via an optical fiber and one OLT is shared by a plurality of ONUs has become widespread as an efficient optical communication system capable of reducing the costs involved in the installation and management of the optical fiber. However, the network topology of this system has a problem in redundancy because a single optical fiber is shared by a plurality of ONUs.

From the viewpoint of network topology, there are, for example, Japanese Patent No. 6533449 and PCT International Publication No. WO2011/145218 as techniques for solving the problem of redundancy of the PON access system. Japanese Patent No. 6533449 discloses an optical transmission system that performs communication control of signals transmitted on the PON in which a representative node serving as a control entity and a plurality of controlled nodes controlled by the representative node are connected in a ring shape by a plurality of optical transmission paths. PCT International Publication No. WO2011/145218 discloses an optical communication system capable of reducing power consumption and improving reliability while allowing for an increase in the number of ONUs connected per OLT by operating the PON in a ring network configured by a node having a function of ROADM (reconfigurable optical add/drop multiplexer).

In recent years, technical innovation of information communication has been rapidly advanced. For example, a technique utilizing IoT (Internet of Things), Artificial Intelligence (AI), or the like is aimed at solving various social problems. In order to provide services using these technologies, further innovation of information communication is required. For example, in automatic operation and remote operation of a mobile body, various innovations of information communication techniques are required depending on services, such as redundancy of communication, reduction of communication latency, and massive machine type communications.

Japanese Patent No. 6533449
PCT International Publication No. WO2011/145218

SUMMARY OF THE INVENTION

Meanwhile, in a society with such information communication techniques, there is a rapid increase in the amount of data communication and power consumption of communication devices. As a solution to such a situation, a network (all-photonics network) has been studied in which electrical processing is reduced as much as possible and the communication between the network and users is implemented by optical communication by End to End. However, the techniques disclosed in Japanese Patent No. 6533449 and PCT International Publication No. WO2011/145218 are configured to convert optical signals into electric signals, and cannot realize the all-photonics network. Furthermore, a network that converts an optical signal into an electric signal is also presently used therein. In view of this, it is not practical to replace the network with the all-photonics network.

It is an object of the present invention to provide a communication apparatus, a communication system, a storage medium, and a communication method capable of utilizing both currently available communication and next-generation communication by incorporating the configuration of the all-photonics network, while maintaining the configuration of a network for converting an optical signal into an electric signal.

(1) A communication apparatus includes: an optical signal processing unit that transmits a received optical signal to a destination node, in which the optical signal processing unit includes a path switching unit that switches between a first path for transmitting the received optical signal to the destination node as it is as an optical signal, and a second path for transmitting the received optical signal to an electric signal processing unit and transmitting the optical signal processed by the electric signal processing unit to the destination node.

(2) In the communication apparatus according to (1), the electric signal processing unit includes a photoelectric conversion unit that converts an optical signal to an electric signal, and a protocol changing unit that performs processing of changing a communication protocol of an electric signal converted by the photoelectric conversion unit to a communication protocol used between the communication apparatus and the destination node, in which the photoelectric conversion unit converts an electric signal whose communication protocol has been changed by the protocol changing unit to an optical signal and transmits the converted optical signal to the path switching unit, and the path switching unit transmits the optical signal converted by the photoelectric conversion unit to the destination node.

(3) In the communication apparatus according to (2), the protocol changing unit is provided for each of a plurality of communication protocols used between the communication apparatus and the destination node, the second path includes a plurality of paths through which signals are transmitted to the plurality of protocol changing units via the photoelectric conversion unit, and the path switching unit selects a suitable path among the plurality of paths based on a wavelength of the received optical signal, and switches to a selected path.

(4) In the communication apparatus according to (2), the protocol changing unit is provided for each of a plurality of communication protocols used between the communication apparatus and the destination node, and the electric signal processing unit includes an assigning unit that, based on a data frame of the electric signal converted by the photoelectric conversion unit, selects a suitable protocol changing unit among the plurality of protocol changing units, and transmits the electric signal converted by the photoelectric conversion unit to the selected protocol changing unit.

(5) In the communication apparatus according to any one of (1) to (4), the optical signal processing unit includes a demultiplexer that, when receiving an optical signal obtained by multiplexing a plurality of optical signals each having a different wavelength, demultiplexes the optical signal to a plurality of optical signals each having a different wavelength, and transmits the plurality of demultiplexed optical signals to the path switching unit, and the demultiplexer comprises a plurality of demultiplexers.

(6) In the communication apparatus according to any one of (1) to (4), the optical signal processing unit includes a demultiplexer that, when receiving an optical signal obtained by multiplexing a plurality of optical signals each having a different wavelength, demultiplexes the optical signal to a plurality of optical signals each having a different wavelength, and transmits the plurality of demultiplexed optical signals to the path switching unit, and a replication unit that replicates an optical signal having a same wavelength as the optical signals transmitted from the path switching unit.

(7) A communication system includes at least one communication apparatus, and the communication apparatus includes an optical signal processing unit that transmits a received optical signal to a destination node, in which the optical signal processing unit includes a path switching unit that switches between a first path for transmitting the received optical signal to the destination node as it is as an optical signal, and a second path for transmitting the received optical signal to an electric signal processing unit and transmitting the optical signal processed by the electric signal processing unit to the destination node.

(8) A non-transitory computer-readable storage medium storing a program that causes a computer to perform: an optical signal processing step of transmitting a received optical signal to a destination node, in which the optical signal processing step further includes a step of switching between a first path for transmitting the received optical signal to the destination node as it is as an optical signal, and a second path for transmitting the received optical signal to an electric signal processing unit and transmitting the optical signal processed by the electric signal processing unit to the destination node.

(9) A communication method executed by a communication apparatus includes an optical signal processing step of transmitting a received optical signal to a destination node, in which the optical signal processing step further includes a step of switching between a first path for transmitting the received optical signal to the destination node as it is as an optical signal, and a second path for transmitting the received optical signal to an electric signal processing unit and transmitting the optical signal processed by the electric signal processing unit to the destination node.

According to embodiments of the present invention, it is possible to utilize both currently available communication and next-generation communication by incorporating the configuration of the all-photonics network, while maintaining the configuration of a network for converting an optical signal into an electric signal.

DETAILED DESCRIPTION OF THE INVENTION

Figure 1:
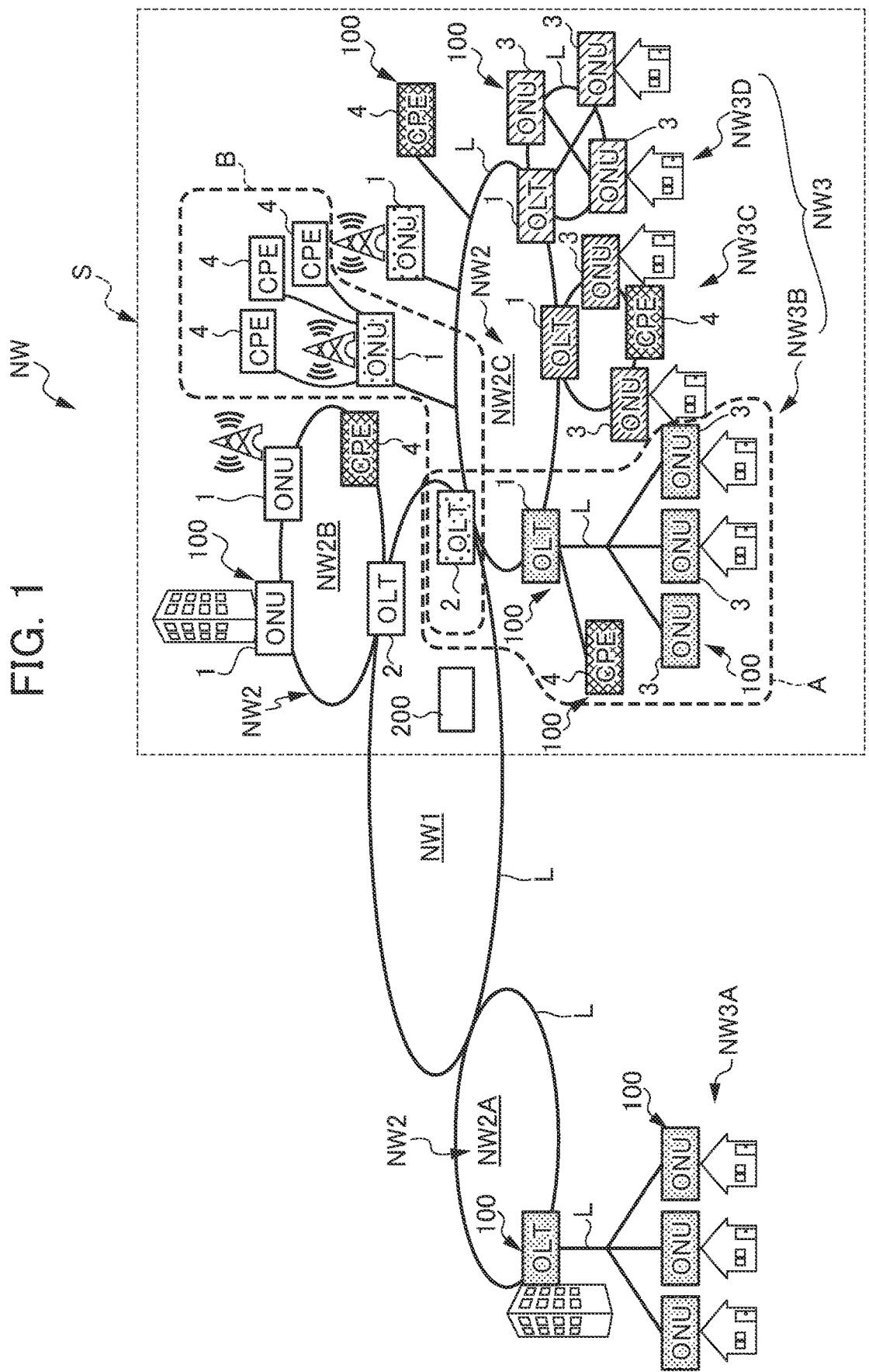
FIG. 1 is a schematic diagram showing an example of a communication system according to an embodiment of the present invention and an optical communication network to which the communication system is applied.

Hereinafter, a communication system S according to embodiments of the present invention will be described. The present invention is not limited to the following embodiments. In addition, each drawing referred to in the following description merely schematically shows the shape, size, and positional relationship to an extent that the contents of the present disclosure can be understood. That is, the present invention is not limited to the shapes, sizes, and positional relationships illustrated in the drawings.

The communication system S according to an embodiment of the present invention is applied to an optical communication network NW, and is configured to adjust a transmission path of an optical signal and adjust whether or not to perform a conversion process to an electric signal according to the optical signal. FIG. 1 is a schematic diagram showing an example of the communication system S and an optical communication network NW to which the communication system S is applied.

First, the optical communication network NW will be described. The optical communication network NW includes a plurality of nodes 100 and an optical line L connecting the nodes, and is a network in which communication is mainly performed by optical signals. For example, as shown in FIG. 1, the optical communication network NW includes a core network NW1, metro networks NW2A to NW2C which are a plurality of metro networks NW2, and access networks NW3A to NW3D which are a plurality of access networks NW3. The optical line L includes, for example, an optical fiber cable.

The core network NW1 is a large-scale backbone communication network installed in an area in a range of more than 100 km. The metro networks NW2 are each a communication line network that is connected to the core network NW1 and mainly connects communication facilities of communication providers such as base stations and accommodation stations. The metro network NW2 is laid in an area within a range of less than 100 km. The access networks NW3 are each connected to the metro networks NW2 and the core network NW1, and are each a communication line network connecting communication facilities of communication providers and subscribers. The access networks NW3 are each laid in an area within a range of less than 10 km. In the example shown in FIG. 1, the communication system S is applied to an area including metro networks NW2B and NW2C, the access networks NW3B to NW3D, and the like.

Next, the communication system S will be described. The communication system S comprises the plurality of nodes 100 including at least one access optical node 1, and a management server 200. The plurality of nodes 100 are each a device included in the optical communication network NW and capable of transmitting and receiving data. The plurality of nodes 100 perform communication by transmitting and receiving optical signals to and from each other via the optical line L. In the communication system S, optical signals are transmitted by a multiplexing method such as time division multiplexing (TDM) or wavelength division multiplexing (WDM). In the communication system S of the present embodiment, a plurality of optical signals of different wavelengths are simultaneously transmitted to one optical line L by wavelength division multiplexing.

The plurality of nodes 100 includes, for example, an access optical node 1 as at least one communication apparatus, a metro optical node 2, an ONU 3 as an optical line termination device on the subscriber side, and CPE 4 (Customer Premises Equipment).

The access optical node 1 performs either an operation of converting an optical signal into an electric signal or an operation of transmitting an optical signal to a destination node 100 without performing a conversion process of the optical signal into an electric signal according to the wavelength of the optical signal received from another node 100. The access optical node 1 may comprise, for example, a function as an ONU or a function as an OLT. The configuration of the access optical node 1 will be described later.

The metro optical node 2 is a node 100 that connects the core network NW1 and the metro network NW2. The metro optical node 2 functions as an OLT, which is an optical line termination device on the communication provider side.

The ONU 3 is connected to the access optical node 1 via the optical line L. The ONU 3 provides a PON access system with the access optical node 1 with the function of an OLT. In the communication system S according to the present embodiment, there are a plurality of ONUs 3 having different communication protocols. The optical signal transmitted from the access optical node 1 is supplied to the subscriber via the ONU 3.

The CPE 4 (Customer Premises Equipment) is a communication device corresponding to End to End optical communication and provided in a facility on the subscriber side.

The CPE 4 is a device capable of transmitting and receiving optical signals not subjected to an electrical processing step. In the example shown in FIG. 1, the CPE 4 is connected to the metro optical node 2, the access optical node 1, the ONU 3, and the like.

The management server 200 is an arithmetic unit configured by a processor, and reads and executes various programs and data from a storage unit (not shown). The processor may be, for example, a CPU (central processing unit), an MPU (micro processing unit), an SoC (system on a chip), a DSP (digital signal processor), a GPU (graphics processing unit), a VPU (vision processing unit), an ASIC (application specific integrated circuit), a PLD (programmable logic device) or an FPGA (field-programmable gate array).

The management server 200 executes, for example, a process of controlling a communication path of an optical signal in the communication system S. The management server 200 includes an acquisition unit (not shown) that acquires information about transmission and reception of optical signals by the plurality of nodes 100 in the communication system S, a detection unit (not shown) that detects the occurrence of an abnormality in the communication path based on information acquired by the acquisition unit, and a control unit (not shown) that changes the wavelength of the optical signal transmitted by the node 100 when the abnormality in the communication system S is detected by the detection unit. When the management server 200 detects an abnormality in the communication system S, the management server 200 performs control to change the wavelength of the optical signal transmitted from the metro optical node 2, thereby changing the communication path through which the optical signals are transmitted.

Figure 2:
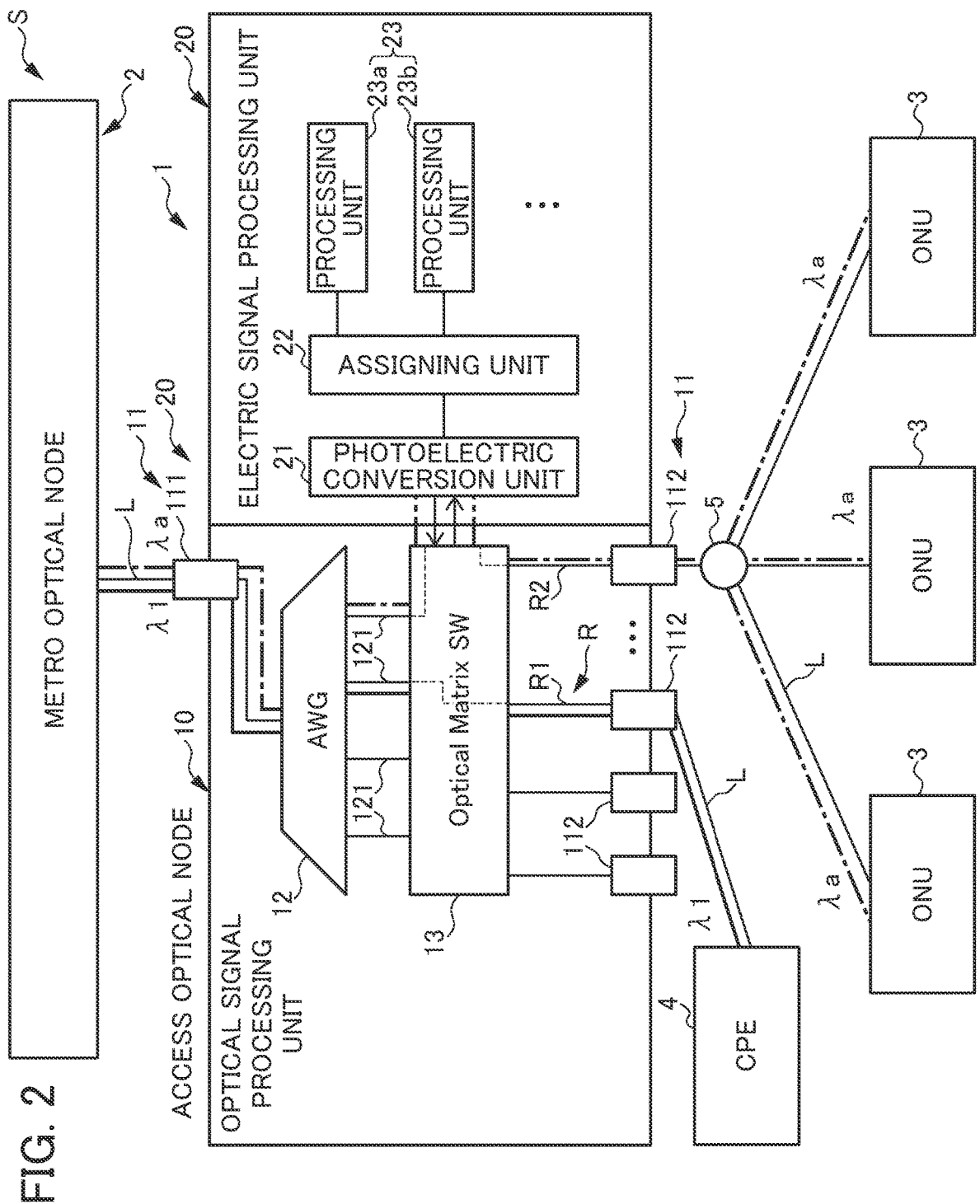
FIG. 2 is a schematic diagram showing an internal structure of an access optical node arranged in a region A of the communication system shown in FIG. 1, and nodes around the access optical node according to the first embodiment.

Next, the configuration of the access optical node 1 according to the first embodiment will be described. FIG. 2 is a schematic diagram showing the internal configuration of the access optical node 1 according to the first embodiment existing in the area A of the communication system S shown in FIG. 1. The access optical node 1 according to the present embodiment includes an optical signal processing unit 10 and an electric signal processing unit 20. The access optical node 1 shown in FIG. 2 is a communication apparatus having a function as an OLT.

The optical signal processing unit 10 transmits an optical signal received from another node 100 to the destination node 100 via one of a plurality of internal paths R. The optical signal processing unit 10 includes a communication interface 11, a multiplexing/demultiplexing unit 12 functioning as a demultiplexer, and a path switching unit 13. The optical signal processing unit 10 may include a processor and a storage unit (not shown), and the processor may read various programs and data from the storage unit and perform predetermined data processing. The processor may be, for example, a CPU (central processing unit), an MPU (micro processing unit), an SoC (system on a chip), a DSP (digital signal processor), a GPU (graphics processing unit), a VPU (vision processing unit), an ASIC (application specific integrated circuit), a PLD (programmable logic device), or an FPGA (field-programmable gate array).

The communication interface 11 is an interface for transmitting optical signals to and from another node 100. The communication interface 11 is connected to an optical line L connecting the access optical node 1 and another node 100. The communication interface 11 of the access optical node 1 shown in FIG. 2 includes a high-order communication interface 111 and a plurality of low-order communication interfaces 112.

The high-order communication interface 111 is an interface for receiving optical signals from the metro optical node 2 disposed in the metro network NW2 which is a high-order network.

The low-order communication interfaces 112 are each an interface for transmitting optical signals to the node 100 such as the ONU 3 or the CPE 4 disposed in the access network NW3 which is a low-order network. The plurality of low-order communication interfaces 112 are connected to the optical line L through which optical signals of different wavelengths are transmitted.

The multiplexer/demultiplexer unit 12 is a multiplexer/demultiplexer capable of executing a process of multiplexing optical signals and a process of performing demultiplexing into optical signals of a plurality of different wavelengths when the multiplexer/demultiplexer unit 12 receives optical signals obtained by multiplexing optical signals of a plurality of different wavelengths. The multiplexer/demultiplexer unit 12 is configured by, for example, an arrayed waveguide grating (AWG). As shown in FIG. 2, the multiplexer/demultiplexer unit 12 demultiplexes an optical signal received from the metro optical node 2 via the high-order communication interface 111 into a plurality of optical signals of different wavelengths. The multiplexing/demultiplexing unit 12 includes a plurality of output waveguides 121, and transmits the optical signals of the plurality of different wavelengths, which are demultiplexed, to the path switching unit 13 via the corresponding output waveguides 121 for each wavelength.

The path switching unit 13 executes, based on the wavelength of the optical signal received from the multiplexing/demultiplexing unit 12, a process of switching the internal path R of the optical signal between the first path R1 and the second path R2 and transmitting the optical signal to the destination node 100. The first path R1 refers to a path for transmitting the received optical signal to the destination node 100 as it is as an optical signal. The second path R2 refers to a path for transmitting the received optical signal to the electric signal processing unit 20 and transmitting the optical signal processed by the electric signal processing unit 20 to the destination node 100. The second path R2 refers to a path through which processing for converting an optical signal into an electric signal is executed, and the first path R1 refers to a path through which processing for converting an optical signal into an electric signal is not executed. The optical signal input to the path switching unit 13 is transmitted to the destination node 100 via the internal path R selected by the path switching unit 13.

In the example shown in FIG. 2, the optical signal of the wavelength Aa received through the second path R2 is transferred to the electric signal processing unit 20, and after being subjected to electrical processing, is transmitted to the optical splitter 5 through the low-order communication interface 112. The optical signal transmitted to the optical splitter 5 is replicated into a plurality of optical signals and transmitted to the ONU 3 as a destination. On the other hand, the optical signal transmitted through the first path R1 is not transferred to the electric signal processing unit 20, but is transmitted to the CPE 4 through the low-order communication interface 112. Since the optical signal transmitted through the first path R1 is transmitted to the destination node 100 without undergoing the electrical processing step, it is possible to resolve the bottleneck of the communication due to the electrical processing. Examples of the bottleneck include limits of increase in capacity of communication in which electrical switching of communication strongly depends on a semiconductor process, limits of decrease in latency due to processing latency due to photoelectric conversion or phase fluctuation due to packet processing, heat loss of electric signals, limits of power consumption due to photoelectric conversion, and the like.

Figure 3:
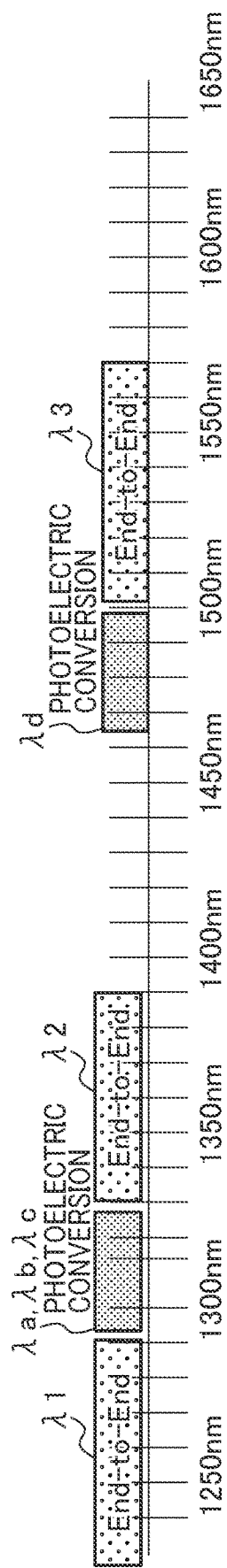
FIG. 3 is a diagram showing an example of allocation of wavelengths of optical signals not electrically converted and wavelengths of optical signals electrically converted in the access optical node according to the first embodiment.

FIG. 3 is a diagram showing an example of allocation of wavelengths of optical signals to be electrically converted and wavelengths of optical signals not to be electrically converted in the access optical node 1. As shown in FIG. 3, the optical signal is distinguished into an optical signal that is photoelectrically converted and an optical signal that is not photoelectrically converted according to the wavelength band. In the present embodiment, the wavelength band of the optical signal that is electrically converted in the access optical node 1 and the wavelength band of the optical signal that is not electrically converted in the access optical node 1 are set in advance. However, each wavelength band may be changeable according to an input operation of the user to the optical signal processing unit 10.

The electric signal processing unit 20 performs electrical processing on the optical signal transferred from the optical signal processing unit 10 through the second path R2 so as to enable communication with the destination node 100. The electric signal processing unit 20 includes a photoelectric conversion unit 21, an assigning unit 22, and a plurality of processing units 23.

The photoelectric conversion unit 21 is an interface that transmits and receives optical signals to and from the optical signal processing unit 10, and is an optical transceiver that converts the optical signals into electric signals and converts the electric signals into optical signals. The photoelectric conversion unit 21 transmits the electric signal converted from the optical signal to the assigning unit 22. The photoelectric conversion unit 21 may have a function of receiving analog signals.

The assigning unit 22 assigns each processing unit 23 for processing an electric signal according to the kind of the electric signal. For example, the assigning unit 22 refers to the data frame of the electric signal, and transmits the electric signal to the corresponding processing unit 23 according to the identifier indicating the type of the communication protocol such as EtherType. That is, based on the data frame of the electric signal converted by the photoelectric conversion unit 21, the assigning unit 22 selects a suitable processing unit 23 among the plurality of processing units 23 and transmits the electric signal converted by the photoelectric conversion unit 21 to the selected processing unit 23. The identifier is not limited to an identifier indicating the type of communication protocol such as Ethernet type, and may be, for example, an identifier of a network such as an IP address or an identifier of a device such as a MAC address.

Each of the plurality of processing units 23 is an arithmetic unit configured by a processor, reads various programs and data from a storage unit (not shown) and executes them, and performs electrical processing on the electric signal transferred from the assigning unit 22. The processor may be, for example, a CPU (central processing unit), an MPU (micro processing unit), an SoC (system on a chip), a DSP (digital signal processor), a GPU (graphics processing unit), a VPU (vision processing unit), an ASIC (application specific integrated circuit), a PLD (programmable logic device) or an FPGA (field-programmable gate array).

Examples of the electrical processing include processing of adjusting data frames of electric signals to change a communication protocol, processing of changing a data rate, and processing of receiving a burst signal. As the processing of changing the communication protocol, for example, the specification of the Ethernet frame or the PON frame may be changed, or the Ethernet frame and the PON frame may be changed. That is, the processing unit 23 may function as a protocol changing unit that performs processing of changing the communication protocol of the electric signal converted by the photoelectric conversion unit 21 to the communication protocol used between the optical access node 1 and the destination node 100. With such a configuration it is possible to change the received optical signal to a signal with a communication protocol capable of communicating with the destination node 100 of the optical signal. Then, the electric signal whose communication protocol has been converted by the processing unit 23 is converted into an optical signal by the photoelectric conversion unit 21, and is transmitted to the path switching unit 13.

The contents of the electrical processing to be executed may be different for each processing unit 23. For example, in the example shown in FIG. 2, a processing unit 23a for converting into a communication protocol corresponding to the communication standard of 10G-EPON, a processing unit 23b for converting into a communication protocol corresponding to the communication standard of XGS-PON, and the like are provided. Furthermore, the processing unit may include a processing unit that converts into G-PON, NG-PON2, and other communication protocols.

Specifically, the processing unit 23a changes the communication protocol by adding 64 bytes of the MPCP multipoint control protocol to an Ethernet header of the MAC layer. Furthermore, the processing unit 23b converts the physical header into an XGEM header and converts the Ethernet header into an XGEM payload to change the communication protocol. It should be noted that the processing unit 23 may be provided for each of a plurality of communication protocols used between the optical access node 1 and the destination nodes 100.

Furthermore, the electric signal processing unit 20 may include an external control communication interface (not shown) that communicably connects the processing unit 23 to an external device of the access optical node 1. With such a configuration, when a signal that cannot be processed in the electric signal processing unit 20 is received, the signal can be transferred to an external device.

Figure 4:
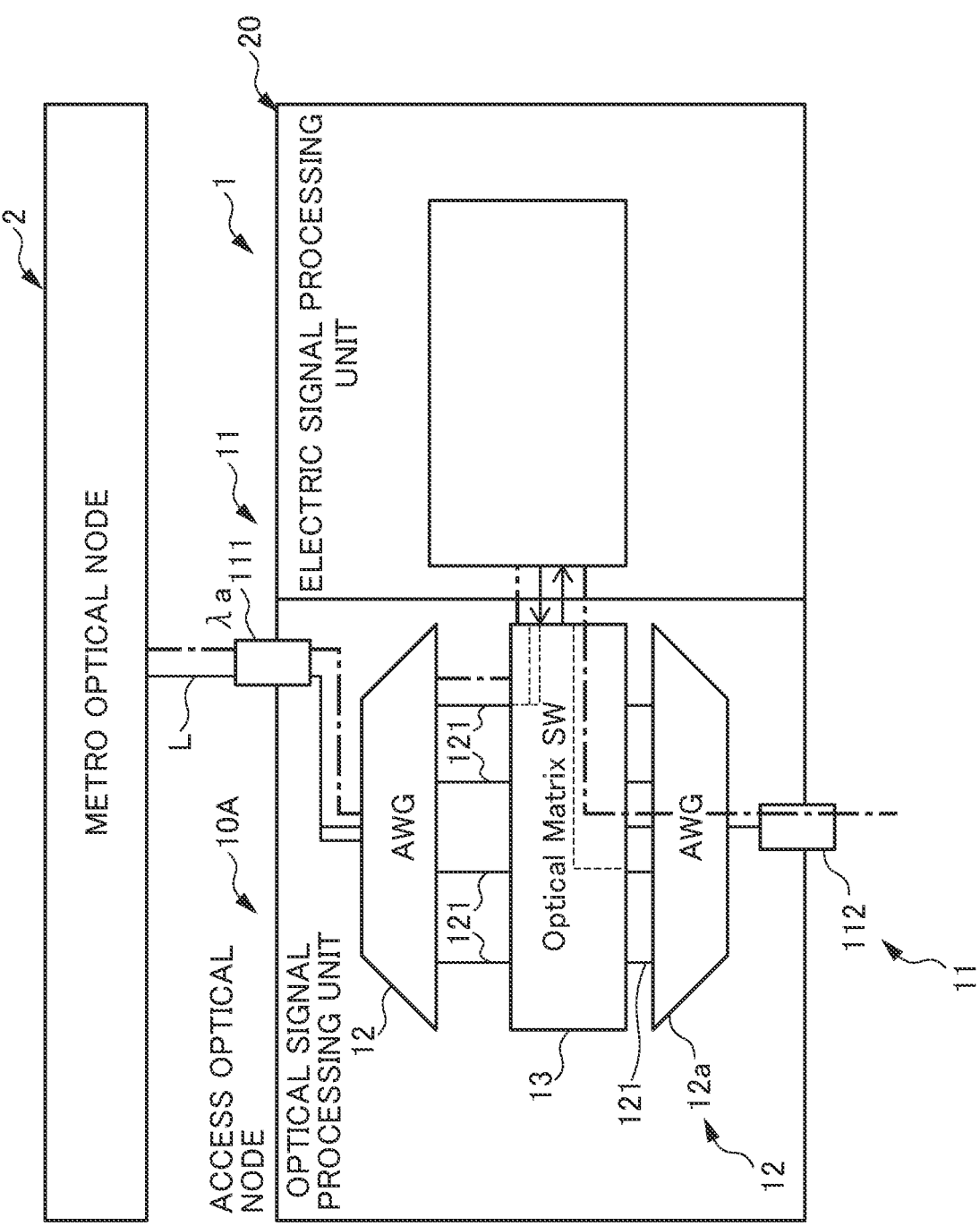
FIG. 4 is a schematic diagram showing a first modification of the optical signal processing unit of the access optical node according to the first embodiment.
Figure 5:
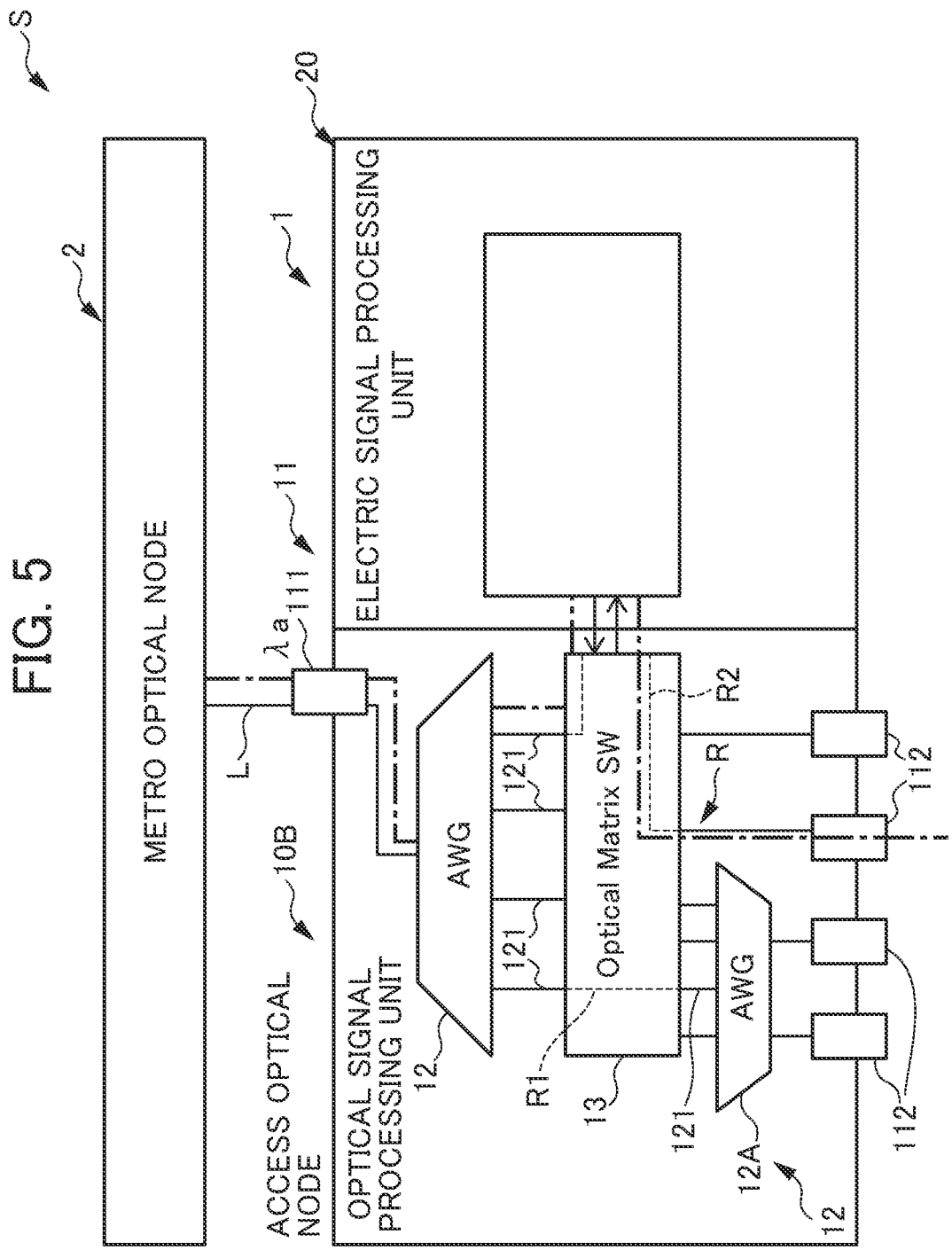
FIG. 5 is a schematic diagram showing a second modification of the optical signal processing unit of the access optical node according to the first embodiment.
Figure 6:
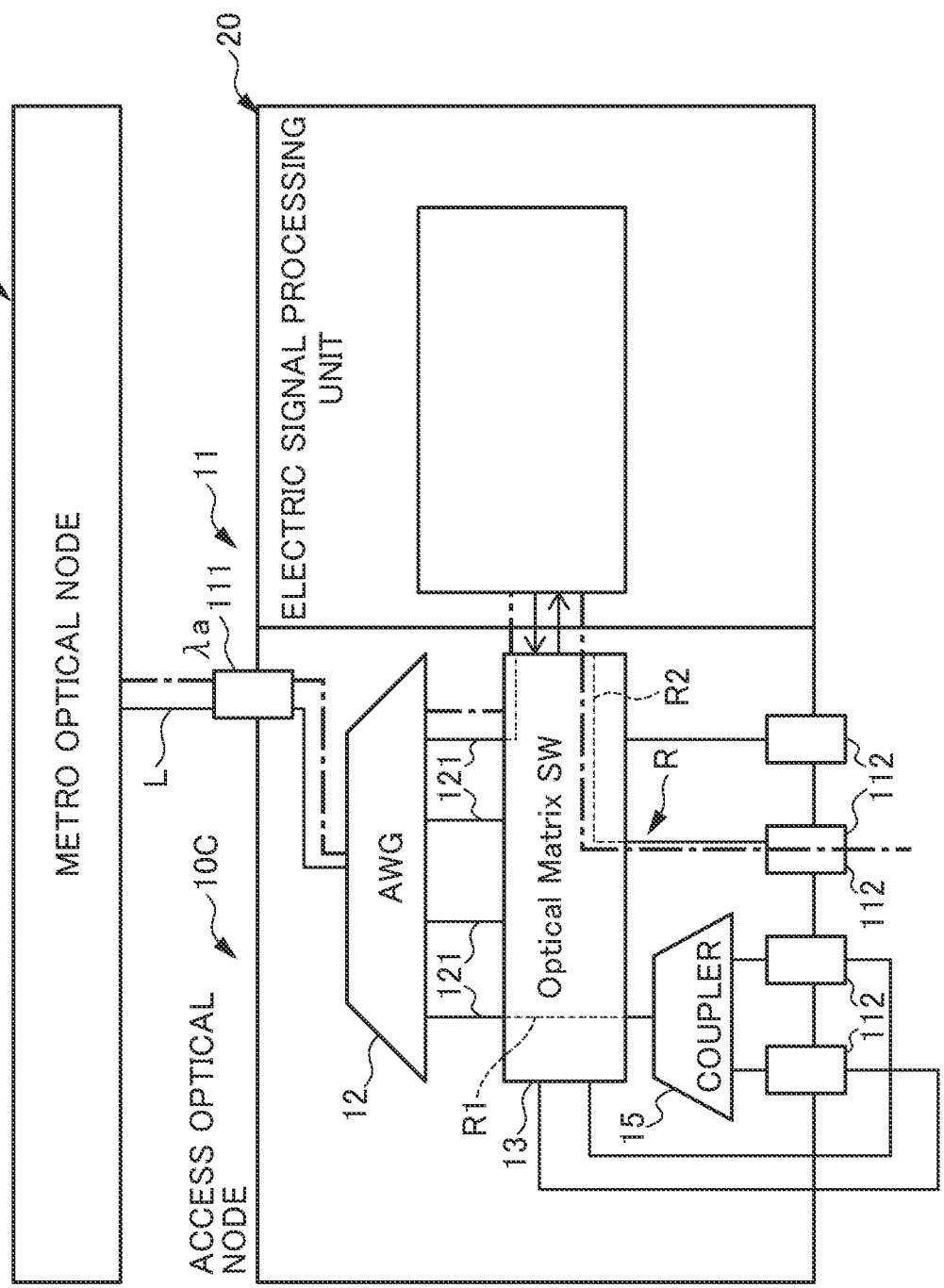
FIG. 6 is a schematic diagram showing a third modification of the optical signal processing unit of the access optical node according to the first embodiment.

Next, a modified example of the optical signal processing unit 10 of the access optical node 1 according to the present embodiment will be described with reference to FIGS. 4 to 6. FIG. 4 is a schematic diagram showing an access optical node 1 including an optical signal processing unit 10A as a first modification of the optical signal processing unit 10. FIG. 5 is a schematic diagram showing an access optical node 1 including an optical signal processing unit 10B as a second modification of the optical signal processing unit 10. FIG. 6 is a schematic diagram showing an access optical node 1 including an optical signal processing unit 10C as a third modification of the optical signal processing unit 10. In FIGS. 4 to 6, the photoelectric conversion unit 21, the assigning unit 22, and the processing unit 23 are not shown.

First, the optical signal processing unit 10A will be described. As shown in FIG. 4, the optical signal processing unit 10A is different from the optical signal processing unit 10 mainly in that a plurality of multiplexing/demultiplexing units 12 are provided.

The optical signal processing unit 10A includes a multiplexing/demultiplexing unit 12 provided between the path switching unit 13 and the high-order communication interface 111, and a multiplexing/demultiplexing unit 12 (hereinafter referred to as a low-order multiplexing/demultiplexing unit 12a) provided between the path switching unit 13 and the low-order communication interface 112. The low-order multiplexing/demultiplexing unit 12a includes a plurality of output waveguides 121 connected to the path switching unit 13. The low-order multiplexing/demultiplexing unit 12a is configured to transmit an optical signal transmitted from the path switching unit 13 via the output waveguides 121 to the destination node 100, and to demultiplex the optical signal received via the low-order communication interface 112 into a plurality of optical signals of different wavelengths. That is, it is possible to demultiplex an optical signal transmitted from a low-order network by wavelength division multiplexing, and perform appropriate processing for each wavelength. In the optical signal processing unit 10A, all the low-order communication interfaces 112 are connected to the path switching unit 13 via the low-order multiplexing/demultiplexing unit 12a so as to be able to transmit and receive optical signals. With such a configuration, it is possible for the access optical node 1 to divide the signal received from the low-order level into a signal to be transferred as it is as an optical signal, and a signal to be converted from an optical signal to an electric signal and to be processed by performing predetermined processing on the converted electric signal to convert the processed electric signal into an optical signal and then to be transferred.

Next, the optical signal processing unit 10B will be described. As shown in FIG. 5, the optical signal processing unit 10B is different from the optical signal processing unit 10A mainly in the configuration of the multiplexing/demultiplexing unit 12 provided between the path switching unit 13 and the low-order communication interface 112.

As shown in FIG. 5, the optical signal processing unit 10B includes a low-order multiplexing/demultiplexing unit 12A. The low-order multiplexing/demultiplexing unit 12A includes a plurality of output waveguides 121 connected to the path switching unit 13. The low-order multiplexing/demultiplexing unit 12A is configured to transmit an optical signal transmitted from the path switching unit 13 to the destination node 100 via the output waveguide 121, and to demultiplex the optical signal received via the low-order communication interface 112 into a plurality of optical signals of different wavelengths.

In the optical signal processing unit 10B, unlike the optical signal processing unit 10A, only a part of the low-order communication interfaces 112 is connected to the path switching unit 13 via the low-order multiplexing/demultiplexing unit 12A so as to transmit and receive optical signals. That is, the optical signal processing unit 10B includes a low-order communication interface 112 that directly transmits and receives an optical signal to and from the path switching unit 13, and a low-order communication interface 112 that directly transmits and receives an optical signal to and from the low-order multiplexing/demultiplexing unit 12A.

Next, the optical signal processing unit 10C will be described. As shown in FIG. 6, the optical signal processing unit 10C is different from the optical signal processing unit 10 mainly in that the optical signal processing unit 10C includes an optical splitter 15 as a replication unit provided between the path switching unit 13 and the low-order communication interface 112. The optical splitter 15 may incorporate an amplifier for amplifying the intensity of the replicated optical signal.

The optical splitter 15 includes an optical coupler having a function of replicating an optical signal. In the example shown in FIG. 6, the optical splitter 15 replicates an optical signal having the same wavelength as the optical signal transmitted from the path switching unit 13, and transmits each optical signal to two low-order communication interfaces 112. The optical signal transmitted to the low-order communication interface 112 is returned to the path switching unit 13. With such a configuration, it is possible to generate a plurality of optical signals having the same wavelength in the access optical node 1. Furthermore, the optical splitter 15 may demultiplex at the same wavelength. Furthermore, the optical splitter 15 can perform multicasting with respect to the optical communication of End to End by the above-described configuration.

Figure 7:
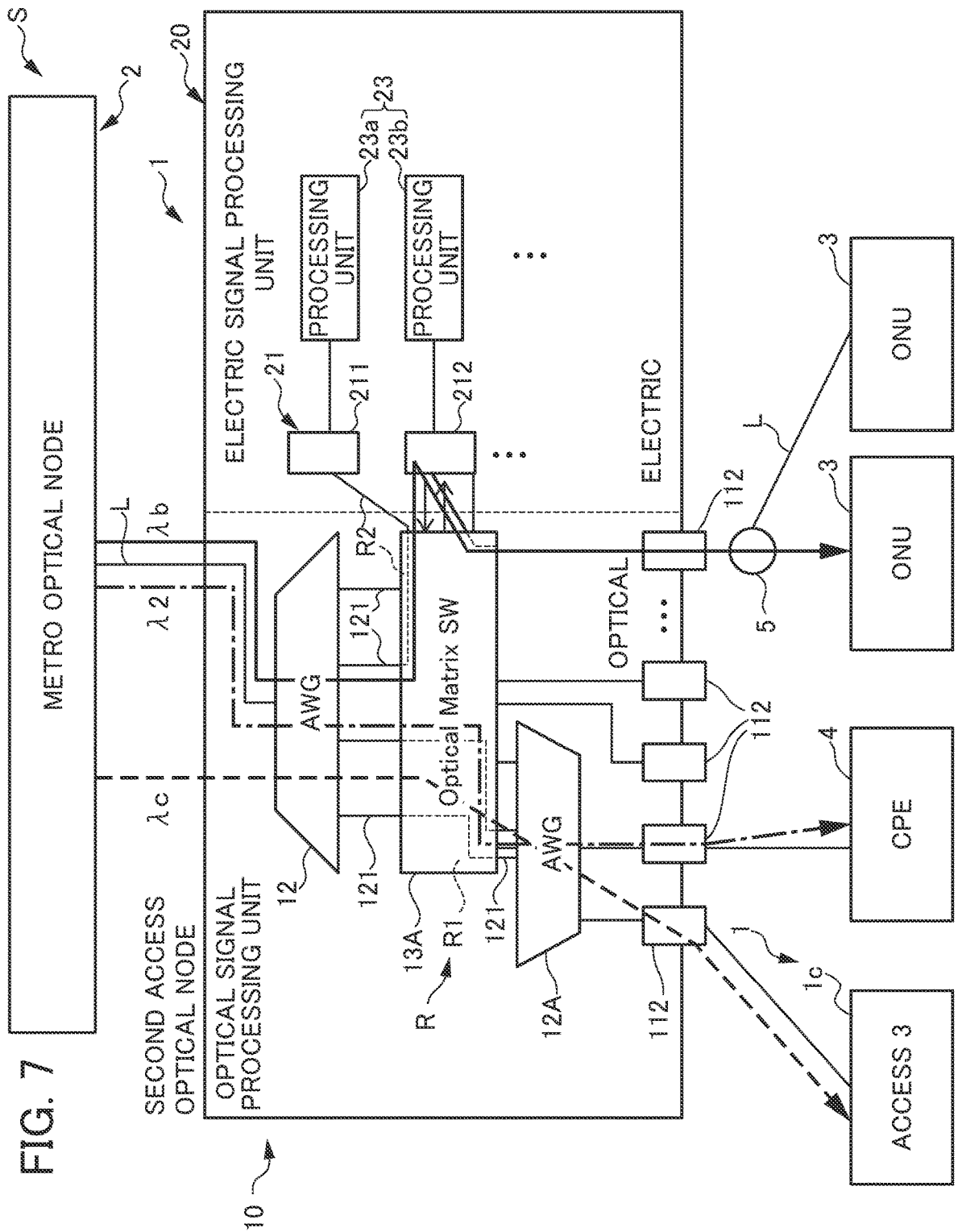
FIG. 7 is a schematic diagram showing an internal structure of an access optical node and nodes around the access optical node according to the second embodiment.
Figure 8:
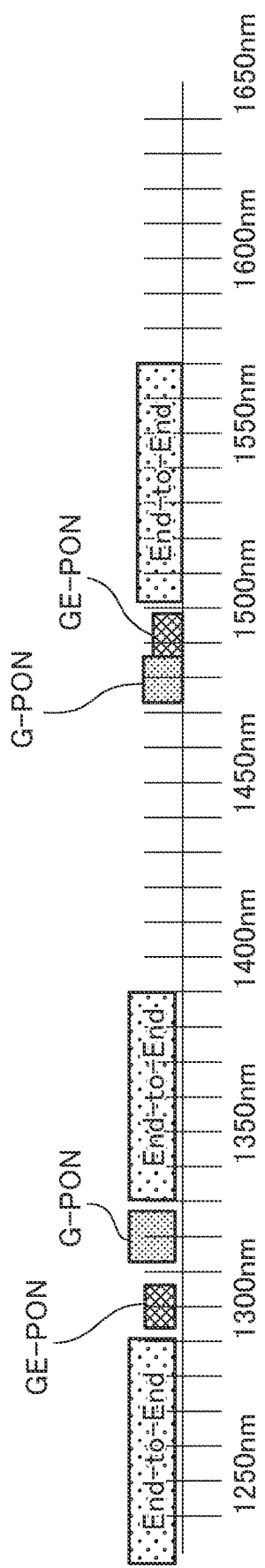
FIG. 8 is a diagram showing an example of allocation of wavelengths of an optical signal which is not electrically converted and wavelengths of an optical signal which is electrically converted and transmitted to each processing unit, in the access optical node according to the second embodiment.
Figures 9, 10:
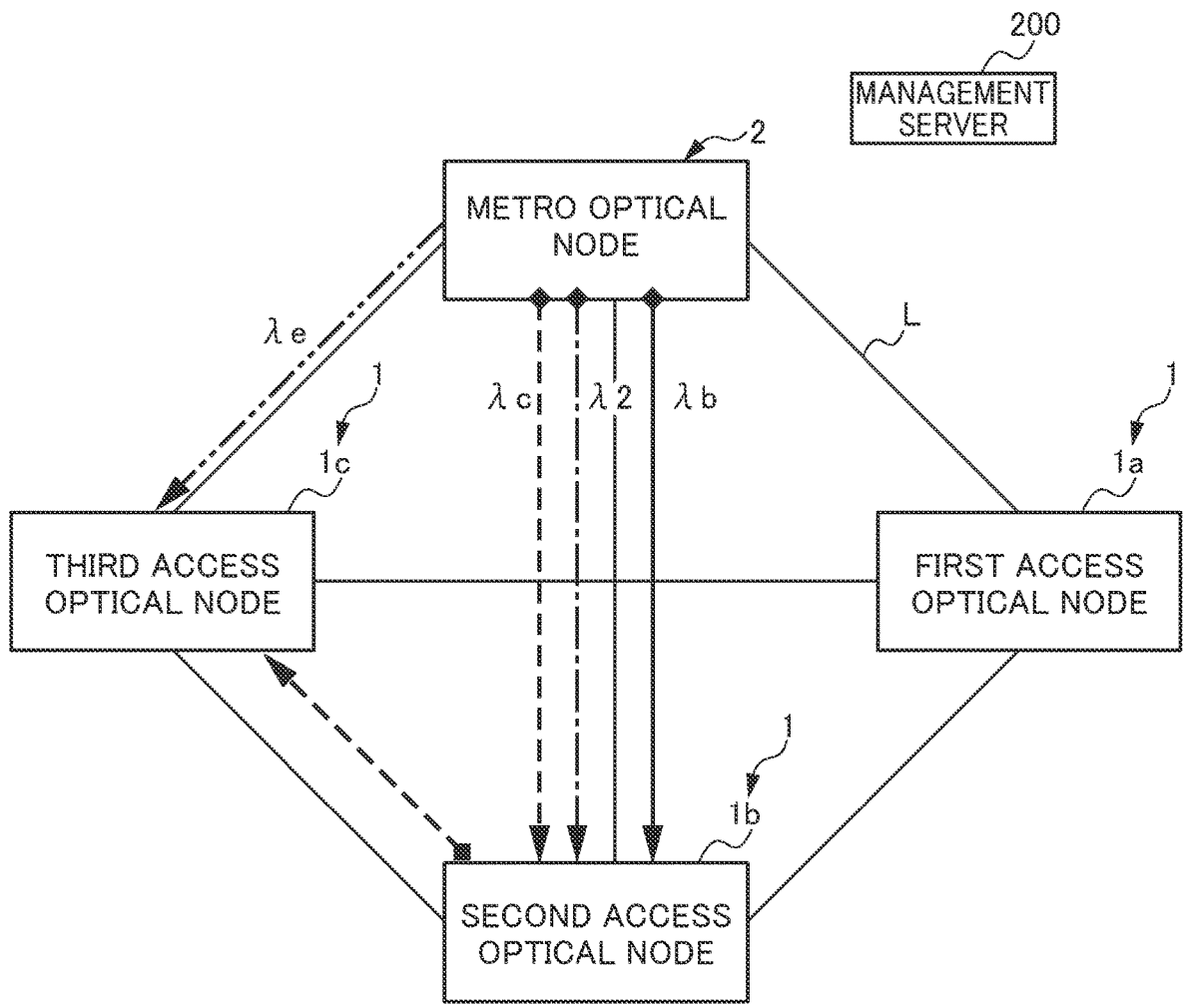
FIG. 9 is a schematic diagram showing an example of optical communication by the access optical node shown and the peripheral nodes in FIG. 7 in the communication system according to an embodiment of the present invention.
FIG. 10 is a table showing wavelength bands of optical signals for which nodes are destinations and processing contents of optical signals in the nodes in the communication system shown in FIG. 9.

Next, an access optical node 1 according to a second embodiment will be described with reference to FIGS. 7 to 10. FIG. 7 is a schematic diagram showing an internal structure of the access optical node 1 and peripheral nodes 100 around the access optical node 1 according to the second embodiment. FIG. 8 is a diagram showing an example of allocation of wavelengths of optical signals not electrically converted in the access optical node 1 according to the second embodiment and wavelengths of optical signals electrically converted and used for communication of respective communication protocols. FIG. 9 is a schematic diagram showing an example of optical communication by the access optical node 1 shown in FIG. 7 and the peripheral nodes 100 around the access optical node 1 in the communication system S. FIG. 10 is a table showing wavelength bands of optical signals for which the nodes 100 are destinations and processing contents of optical signals in the nodes 100 in the communication system S shown in FIG. 9.

The access optical node 1 according to the second embodiment differs from the access optical node 1 according to the first embodiment mainly in that the electric signal processing unit 20 does not include the assigning unit 22, and instead of the assigning unit 22, the path switching unit 13A of the optical signal processing unit 10 selects the processing unit 23 to be a transmission destination of the signal based on the wavelength of the optical signal.

As shown in FIG. 7, the optical signal processing unit 10 of the present embodiment includes the low-order multiplexing/demultiplexing unit 12A similarly to the configuration of the optical signal processing unit 10B shown in FIG. 5, and only a part of the low-order communication interfaces 112 is connected to the path switching unit 13A via the low-order multiplexing/demultiplexing unit 12A so as to be able to transmit and receive an optical signal. However, the optical signal processing unit 10 of the present embodiment is not limited thereto. For example, the optical signal processing unit 10 of the present embodiment may include a configuration in which all the low-order communication interfaces 112 are connected to the path switching unit 13 via the low-order multiplexing/demultiplexing unit 12a so as to be able to transmit and receive optical signals, as shown in FIG. 4, a configuration in which the optical signal processing unit 10 includes the optical splitter 15 as shown in FIG. 6, or a configuration in which the optical signal processing unit 10 does not include the low-order multiplexing/demultiplexing units 12a and 12A or the optical splitter 15 as shown in FIG. 2.

The electric signal processing unit 20 of the access optical node 1 according to the present embodiment includes a plurality of photoelectric conversion units 21 (for example, photoelectric conversion units 211 and 212) and a plurality of processing units 23 (for example, processing units 23a and 23b).

The plurality of photoelectric conversion units 21 are connected to the path switching unit 13A (described later) of the optical signal processing unit 10 via different second paths R2. In addition, the photoelectric conversion units 21 are connected to the processing units 23 via different second paths R2. The second paths R2 of the second access optical node 1B include a plurality of paths separately connected to the plurality of processing units 23 from the path switching unit 13A. That is, the second paths R2 include a plurality of paths through which signals are transmitted to the plurality of processing units 23 via the photoelectric conversion units 21.

The path switching unit 13A of the access optical node 1 according to the present embodiment selects a suitable path among a plurality of paths of the second path R2 based on the wavelength of the optical signal, and executes a process of switching to the selected path. That is, the path switching unit 13A switches the internal path R through which the optical signal passes between the first path R1 and the second path R2, and executes a process of selecting the internal path R connected to any one of the processing units 23 among the plurality of second paths R2 when switching to the second path R2.

Here, a difference between the optical signal processing unit 10 according to the first embodiment and the optical signal processing unit 10 according to the second embodiment will be described with reference to FIGS. 3 and 8. The optical signal processing unit 10 according to the first embodiment selects whether to transmit the received optical signal to the destination node 100 without passing through the electric signal processing unit 20 or to the destination node 100 through the electric signal processing unit 20 based on the wavelength thereof. For example, as shown in FIG. 3, when the optical signal processing unit 10 according to the first embodiment receives an optical signal having a wavelength of λ1, the optical signal processing unit 10 transmits the optical signal to the destination node 100 without passing through the electric signal processing unit 20, and when the optical signal processing unit 10 receives an optical signal having a wavelength of λd, the optical signal processing unit 10 transmits the optical signal to the destination node 100 through processing such as photoelectric conversion in the electric signal processing unit 20. On the other hand, the optical signal processing unit 10 according to the second embodiment not only selects whether or not to transmit the received optical signal to the destination node 100 via the electric signal processing unit 20 based on the wavelength thereof, but also selects the processing unit 23 serving as the transmission destination of the signal among the plurality of processing units 23 of the electric signal processing unit 20 when transmitting the optical signal via the electric signal processing unit 20. As shown in FIG. 8, the wavelength band of the optical signal to be used is determined according to the communication protocol. The optical signal processing unit 10 according to the second embodiment selects an internal path R connected to the processing unit 23 that executes processing corresponding to any one of the communication protocols among the plurality of processing units 23 according to the wavelength of the optical signal.

Next, an example of optical communication by the access optical node 1 and the peripheral nodes 100 around the access optical node 1 of the second embodiment shown in FIG. 7 in the communication system S will be described with reference to FIGS. 9 and 10. As an example of optical communication by the communication system S, a flow of optical communication among the metro optical node 2, the first access optical node 1a, the second access optical node 1b, and the third access optical node 1c, which are the three access optical nodes 1, will be described. In the following description, when the first access optical node 1a, the second access optical node 1b, and the third access optical node 1c are referred to without distinction, they are simply referred to as "access optical node 1". The access optical node 1 of the second embodiment shown in FIG. 7 is also the second access optical node 1b shown in FIG. 9.

The first access optical node 1a, the second access optical node 1b, and the third access optical node 1c are able to transmit and receive optical signals from the metro optical node 2 via the optical line L, respectively, and function as the OLT on the side of the communication provider. Although not shown in FIG. 9, each of the access optical nodes 1 is connected to a node 100 such as ONU3 or CPE4 provided in the access network NW3, which is a low-order network, via the optical line L.

FIG. 10 is a table in which wavelength bands of optical signals to which the metro optical node 2, the first access optical node 1a, the second access optical node 1b, and the third access optical node 1c are destinations in the communication system S shown in FIG. 9 are associated with processing contents of optical signals in the nodes 100. For example, when the wavelength band of the optical signal is λ1, the optical signal is transmitted to the first access optical node 1a, and is transmitted to the node 100 such as the CPE 4 without undergoing photoelectric conversion or electrical processing in the first access optical node 1a.

An optical signal having a wavelength band of λb is transmitted from the metro optical node 2 to the second access optical node 1b as shown in FIGS. 7 to 9. Then, the optical signal is transferred to the electric signal processing unit 20 via the second path R2 selected by the path switching unit 13A of the second access optical node 1b. Specifically, the optical signal is converted into an electric signal by the photoelectric conversion unit 21, and the electric signal is transmitted to the processing unit 23a which converts the electric signal into a communication protocol of 10G-EPON. Then, the electric signal converted into the communication protocol by the processing unit 23a is returned to the photoelectric conversion unit 21, converted into an optical signal, and then transmitted to the ONU 3 via the low-order communication interface 112, the optical splitter 5, and the like.

The optical signal whose wavelength band is λ2 is transmitted from the metro optical node 2 to the second access optical node 1b, and is transmitted to the CPE 4 without undergoing electrical processing through the first path R1 selected by the path switching unit 13. That is, the optical signal is transmitted to the CPE 4 without undergoing electrical processing. Since the communication can be performed without undergoing the electrical processing, it is possible to realize a reduction in latency and suppression of power consumption for the communication.

Furthermore, in the communication system S, in a predetermined situation, the optical signal may be transmitted to the destination access optical node 1 via another access optical node 1 instead of being directly transmitted to the destination access optical node 1 from the metro optical node 2. For example, the optical signal whose wavelength band is λc shown in FIG. 9 is transmitted from the metro optical node 2 to the third access optical node 1c serving as the destination via the second access optical node 1b. Examples of the predetermined situation include, for example, a case where a function needs to be used which is not installed in the electric signal processing unit 20 of the access optical node 1 serving as the destination and installed in another access optical node 1, and a case where an abnormality in communication between the metro optical node 2 and the access optical node 1 serving as the destination is detected. Examples of the communication abnormality include an increase in packet loss detected by the management server 200.

As a method of passing another access optical node 1, for example, the following methods (a) and (b) are exemplified.

(a) The management server 200 or the like changes the wavelength of the optical signal from the wavelength directly transmitted to the access optical node 1 serving as the destination to the wavelength transmitted to the access optical node 1 serving as the destination via another access optical node 1. For example, as shown in FIG. 9, the wavelength of the optical signal transmitted from the metro optical node 2 may be changed from λe directly transmitted to the third access optical node 1c to λc, and may be transmitted to the third access optical node 1c via the second access optical node 1b.

(b) When each of the nodes 100 receives an optical signal having a wavelength assigned to another node 100 different from its own node 100, each of the nodes 100 is configured to transfer the optical signal to the destination node 100. With such a configuration, an optical signal is then transmitted from the metro optical node 2 to the access optical node 1 different from the destination access optical node 1. For example, in the example shown in FIG. 9, the optical signal whose wavelength is λb may be transmitted from the metro optical node 2 to the first access optical node 1a instead of the second access optical node 1b serving as the destination. In this case, the first access optical node 1a that has received the optical signal of the wavelength assigned to the access optical node 1 different from its own node transfers the optical signal to the second access optical node 1b that is the destination of the optical signal.

According to the embodiments described above, it is possible to achieve the following effects.

The access optical node 1 according to the first embodiment and the second embodiment includes the optical signal processing unit 10 that transmits a received optical signal to a destination node, and the optical signal processing unit 10 includes the path switching unit 13 that switches between the first path R1 for transmitting the received optical signal to the destination node 100 as it is as an optical signal, and the second path R2 for transmitting the received optical signal to the electric signal processing unit 20 and transmitting the optical signal processed by the electric signal processing unit 20 to the destination node 100.

With such a configuration, since it is possible to provide a network enabling coexistence of communication through electrical processing and optical communication through End to End, it is possible to provide a communication service suitable for a user application such as a large capacity, a low latency, and a low power consumption of optical communication through End to End, and a low cost by communication through electrical processing. Therefore, it is possible to utilize both currently available communication and next-generation communication by incorporating the configuration of the all-photonics network while maintaining the configuration of a network for converting an optical signal into an electric signal. Furthermore, it is possible to provide an optimal communication service according to the user's application while suppressing the cost of the infrastructure.

In the access optical node 1 according to the first embodiment and the second embodiment, the electric signal processing unit 20 includes the photoelectric conversion unit 21 that converts an optical signal to an electric signal, and the processing unit 23 that performs processing of changing a communication protocol of an electric signal converted by the photoelectric conversion unit 21 to a communication protocol used between the optical access node 1 and the destination node 100, in which the photoelectric conversion unit 21 converts an electric signal whose communication protocol has been changed by the processing unit 23 to an optical signal and transmits the converted optical signal to the path switching unit 13, and the path switching unit 13 transmits the optical signal converted by the photoelectric conversion unit 21 to the destination node 100.

With such a configuration, since the processing of converting the optical signal into an electric signal to match the communication protocol between the optical access node 1 and the destination node 100 is executed, it is possible to perform optical communication with various nodes 100 using different communication protocols.

Furthermore, in the access optical node 1 according to the first embodiment and the second embodiment, the processing unit 23 is provided for each of a plurality of communication protocols used between the optical access node 1 and the destination node 100, the second path R2 includes a plurality of internal paths R through which signals are transmitted to the plurality of processing units 23 via the photoelectric conversion unit 21, and the path switching unit 13A selects a suitable internal path R among the second paths R2 based on a wavelength of the received optical signal, and switches to a selected internal path.

With such a configuration, since the processing in which the path to the processing unit 23 of the optical signal is allocated is executed on the side of the optical signal processing unit 10, it is possible to reduce the electrical processing and thus reduce the processing load.

In the access optical node 1 according to the first embodiment and the second embodiment, the processing unit 23 is provided for each of a plurality of communication protocols used between the optical access node 1 and the destination node 100, and the electric signal processing unit 20 includes an assigning unit 22 that, based on a data frame of the electric signal converted by the photoelectric conversion unit 21, selects a suitable processing unit 23 among the plurality of processing units 23, and transmits the electric signal converted by the photoelectric conversion unit 21 to the selected processing unit 23.

With such a configuration, since the data frame of the converted electric signal is confirmed and transmitted to the processing unit 23, it is possible to convert the signal into a signal using a communication protocol enabling communication with the destination node 100 more reliably.

In the access optical node 1 according to the first embodiment and the second embodiment, the optical signal processing unit 10 includes the multiplexing/demultiplexing unit 12 that, when receiving an optical signal obtained by multiplexing a plurality of optical signals each having a different wavelength, demultiplexes the optical signal to a plurality of optical signals each having a different wavelength, and transmits the plurality of demultiplexed optical signals to the path switching unit 13, and the multiplexing/demultiplexing unit 12 includes a plurality of multiplexing/demultiplexing units 12.

With such a configuration, it is possible to demultiplex optical signals transmitted from a plurality of communication paths by a multiplexing method and perform appropriate processing for each wavelength.

In the access optical node 1 according to the first embodiment and the second embodiment, the optical signal processing unit 10 includes the demultiplexer 12 that, when receiving an optical signal obtained by multiplexing a plurality of optical signals each having a different wavelength, demultiplexes the optical signal to a plurality of optical signals each having a different wavelength, and transmits the plurality of demultiplexed optical signals to the path switching unit 13, and the optical splitter 15 that replicates an optical signal having the same wavelength as the optical signals transmitted from the path switching unit 13.

With such a configuration, it is possible to generate a plurality of optical signals having the same wavelength in the access optical node 1.

Furthermore, the communication system S according to the first embodiment and the second embodiment is directed to the communication system S including at least one access optical node 1, and the access optical node 1 includes the optical signal processing unit 10 that transmits a received optical signal to the destination node 100, in which the optical signal processing unit 10 includes the path switching unit 13 that switches between the first path R1 for transmitting the received optical signal to the destination node 100 as it is as an optical signal, and the second path R2 for transmitting the received optical signal to an electric signal processing unit 20 and transmitting the optical signal processed by the electric signal processing unit 20 to the destination node 100.

Furthermore, a non-transitory computer-readable storage medium storing the program according to the first embodiment and the second embodiment causes a computer to perform the steps of: performing the optical signal processing step of transmitting a received optical signal to the destination node 100, and the optical signal processing step further includes the step of switching between the first path R1 for transmitting the received optical signal to the destination node 100 as it is as an optical signal, and the second path R2 for transmitting the received optical signal to an electric signal processing unit 20 and transmitting the optical signal processed by the electric signal processing unit 20 to the destination node 100.

The communication method according to the first embodiment and the second embodiment executed by the access optical node 1 includes the optical signal processing step of transmitting a received optical signal to the destination node 100, and the optical signal processing step further includes the step of switching between the first path R1 for transmitting the received optical signal to the destination node 100 as it is as an optical signal, and the second path R2 for transmitting the received optical signal to the electric signal processing unit 20 and transmitting the optical signal processed by the electric signal processing unit 20 to the destination node 100.

Although embodiments of the present invention have been described above, the present invention is not limited to the embodiments described above, and can be modified as appropriate.

FIGS. 3 and 8 show examples of wavelength allocation between the access optical node 1 and the metro optical node 2, and are not limited thereto. When the access optical node 1 functions as an ONU and the metro optical node 2 functions as an OLT (in-access optical node), it is necessary to use wavelengths according to each standard defined by IEEE or ITU-T, and the wavelengths are different from those in FIGS. 3 and 8.

Figure 11:
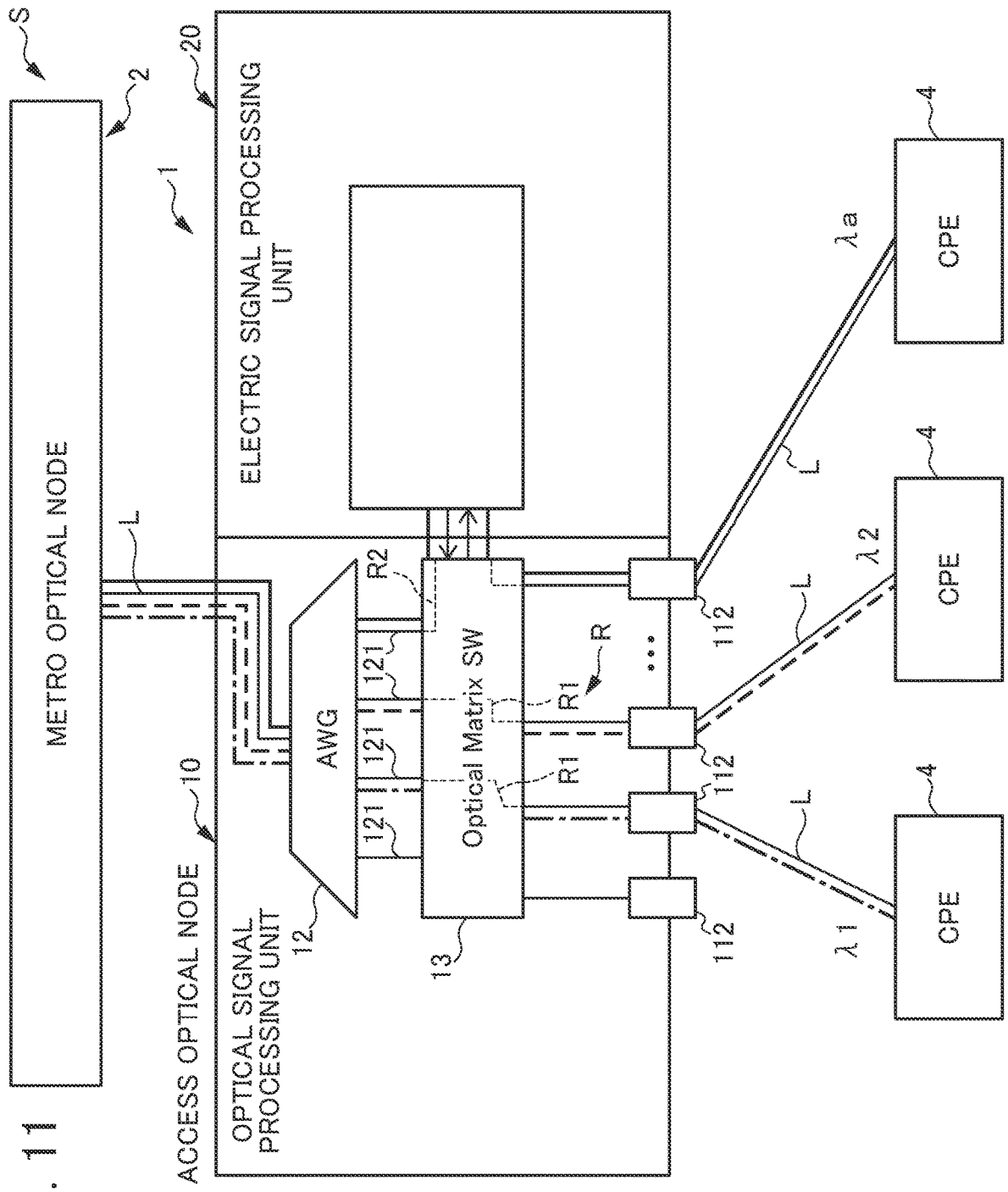
FIG. 11 is a diagram showing an internal structure of an access optical node arranged in a region B of a communication system, and nodes around the access optical node according to an embodiment of the present invention.

The access optical node 1 of the above embodiment has a function as an OLT, but may be a communication apparatus having a function as an ONU. An example of an access optical node 1 having a function as an ONU will be described with reference to FIG. 11. FIG. 11 is a schematic diagram showing the internal structure of the access optical node 1 disposed in the area B of the communication system S shown in FIG. 1 and nodes around the access optical node 1.

As shown in FIG. 11, the access optical node 1 arranged in the area B receives an optical signal transmitted by the WDM multiplexing method from the metro optical node 2 functioning as the OLT of the communication provider, and transmits the optical signal to the plurality of CPEs 4. In the example shown in FIG. 11, the optical signal of the wavelength band λa is transmitted to the CPE 4 through the electric signal processing unit 20, and the optical signals of the wavelength bands λ1 and λ2 are transmitted to the respective CPEs 4 through End to End without passing through the electric signal processing unit 20. Thus, the access optical node 1 can be applied not only to the communication facility on the communication provider side, but also to the communication facility on the subscriber side, and it is possible to realize construction of the optical communication network NW having a high degree of freedom in design.

EXPLANATION OF REFERENCE NUMERALS

1 Access optical node (communication apparatus)
10 Optical signal processing unit
13 Path switching unit
100 Node
R Internal path
R1 First path
R2 Second path
S Communication system

What is claimed is:

1. A communication apparatus comprising:
an optical signal processing unit that transmits a received optical signal to a destination node,
wherein the optical signal processing unit includes a path switching unit that switches between a first path for transmitting the received optical signal to the destination node as it is as an optical signal, and a second path for transmitting the received optical signal to an electric signal processing unit and transmitting the optical signal processed by the electric signal processing unit to the destination node,
wherein the electric signal processing unit includes a photoelectric conversion unit that converts an optical signal to an electric signal, and a protocol changing unit that performs processing of changing a communication protocol of an electric signal converted by the photoelectric conversion unit to a communication protocol used between the communication apparatus and the destination node, wherein the photoelectric conversion unit converts an electric signal whose communication protocol has been changed by the protocol changing unit to an optical signal and transmits the converted optical signal to the path switching unit, and the path switching unit transmits the optical signal converted by the photoelectric conversion unit to the destination node, or
wherein the optical signal processing unit includes a demultiplexer that, when receiving an optical signal obtained by multiplexing a plurality of optical signals each having a different wavelength, demultiplexes the optical signal to a plurality of optical signals each having a different wavelength and transmits the plurality of demultiplexed optical signals to the path switching unit, and a replication unit that replicates an optical signal having a same wavelength as the optical signals transmitted from the path switching unit.

2. The communication apparatus according to claim 1, wherein
the protocol changing unit is provided for each of a plurality of communication protocols used between the communication apparatus and the destination node,
the second path includes a plurality of paths through which signals are transmitted to the plurality of protocol changing units via the photoelectric conversion unit, and
the path switching unit selects a suitable path among the plurality of paths based on a wavelength of the received optical signal, and switches to a selected path.

3. The communication apparatus according to claim 1, wherein
the protocol changing unit is provided for each of a plurality of communication protocols used between the communication apparatus and the destination node, and
the electric signal processing unit includes an assigning unit that, based on a data frame of the electric signal converted by the photoelectric conversion unit, selects a suitable protocol changing unit among the plurality of protocol changing units, and transmits the electric signal converted by the photoelectric conversion unit to the selected protocol changing unit.

4. The communication apparatus according to claim 1, wherein
the electric signal processing unit includes the photoelectric conversion unit that converts the optical signal to the electric signal,
the optical signal processing unit includes a demultiplexer that, when receiving an optical signal obtained by multiplexing a plurality of optical signals each having a different wavelength, demultiplexes the optical signal to a plurality of optical signals each having a different wavelength, and transmits the plurality of demultiplexed optical signals to the path switching unit, and
the demultiplexer comprises a plurality of demultiplexers.

5. A communication system comprising at least one communication apparatus,
the communication apparatus comprising an optical signal processing unit that transmits a received optical signal to a destination node,
wherein the optical signal processing unit includes a path switching unit that switches between a first path for transmitting the received optical signal to the destination node as it is as an optical signal, and a second path for transmitting the received optical signal to an electric signal processing unit and transmitting the optical signal processed by the electric signal processing unit to the destination node,
wherein the electric signal processing unit includes a photoelectric conversion unit that converts an optical signal to an electric signal, and a protocol changing unit that performs processing of changing a communication protocol of an electric signal converted by the photoelectric conversion unit to a communication protocol used between the communication apparatus and the destination node, wherein the photoelectric conversion unit converts an electric signal whose communication protocol has been changed by the protocol changing unit to an optical signal and transmits the converted optical signal to the path switching unit, and the path switching unit transmits the optical signal converted by the photoelectric conversion unit to the destination node, or wherein the optical signal processing unit includes a demultiplexer that, when receiving an optical signal obtained by multiplexing a plurality of optical signals each having a different wavelength, demultiplexes the optical signal to a plurality of optical signals each having a different wavelength and transmits the plurality of demultiplexed optical signals to the path switching unit, and a replication unit that replicates an optical signal having a same wavelength as the optical signals transmitted from the path switching unit.

6. A non-transitory computer-readable storage medium storing a program that causes a computer to perform:

an optical signal processing step of transmitting a received optical signal to a destination node, wherein the optical signal processing step further includes a step of switching between a first path for transmitting the received optical signal to the destination node as it is as an optical signal, and a second path for transmitting the received optical signal to an electric signal processing unit and transmitting the optical signal processed by the electric signal processing unit to the destination node, wherein the electric signal processing unit includes a photoelectric conversion unit that converts an optical signal to an electric signal, and a protocol changing unit that performs processing of changing a communication protocol of an electric signal converted by the photoelectric conversion unit to a communication protocol used between and the computer and the destination node, wherein the photoelectric conversion unit converts an electric signal whose communication protocol has been changed by the protocol changing unit to an optical signal and transmits the converted optical signal to the second, and the second path transmits the optical signal converted by the photoelectric conversion unit to the destination node, or wherein the optical signal processing step further includes a step of, when receiving an optical signal obtained by multiplexing a plurality of optical signals each having a different wavelength, demultiplexing the optical signal to a plurality of optical signals each having a different wavelength and transmits the plurality of demultiplexed optical signals to a path switching unit that is configured to perform the step of switching between the first path and the second path, and replicating an optical signal having a same wavelength as the optical signals transmitted from the path switching unit.

7. A communication method executed by a communication apparatus, the method comprising:

an optical signal processing step of transmitting a received optical signal to a destination node, wherein the optical signal processing step further includes a step of switching between a first path for transmitting the received optical signal to the destination node as it is as an optical signal, and a second path for transmitting the received optical signal to an electric signal processing unit and transmitting the optical signal processed by the electric signal processing unit to the destination node, wherein the electric signal processing unit includes a photoelectric conversion unit that converts an optical signal to an electric signal, and a protocol changing unit that performs processing of changing a communication protocol of an electric signal converted by the photoelectric conversion unit to a communication protocol used between and the communication apparatus and the destination node, wherein the photoelectric conversion unit converts an electric signal whose communication protocol has been changed by the protocol changing unit to an optical signal and transmits the converted optical signal to the second, and the second path transmits the optical signal converted by the photoelectric conversion unit to the destination node, or wherein the optical signal processing step further includes a step of, when receiving an optical signal obtained by multiplexing a plurality of optical signals each having a different wavelength, demultiplexing the optical signal to a plurality of optical signals each having a different wavelength and transmits the plurality of demultiplexed optical signals to a path switching unit that is configured to perform the step of switching between the first path and the second path, and replicating an optical signal having a same wavelength as the optical signals transmitted from the path switching unit.

* * * * *